UNITED STATES PATENT OFFICE.

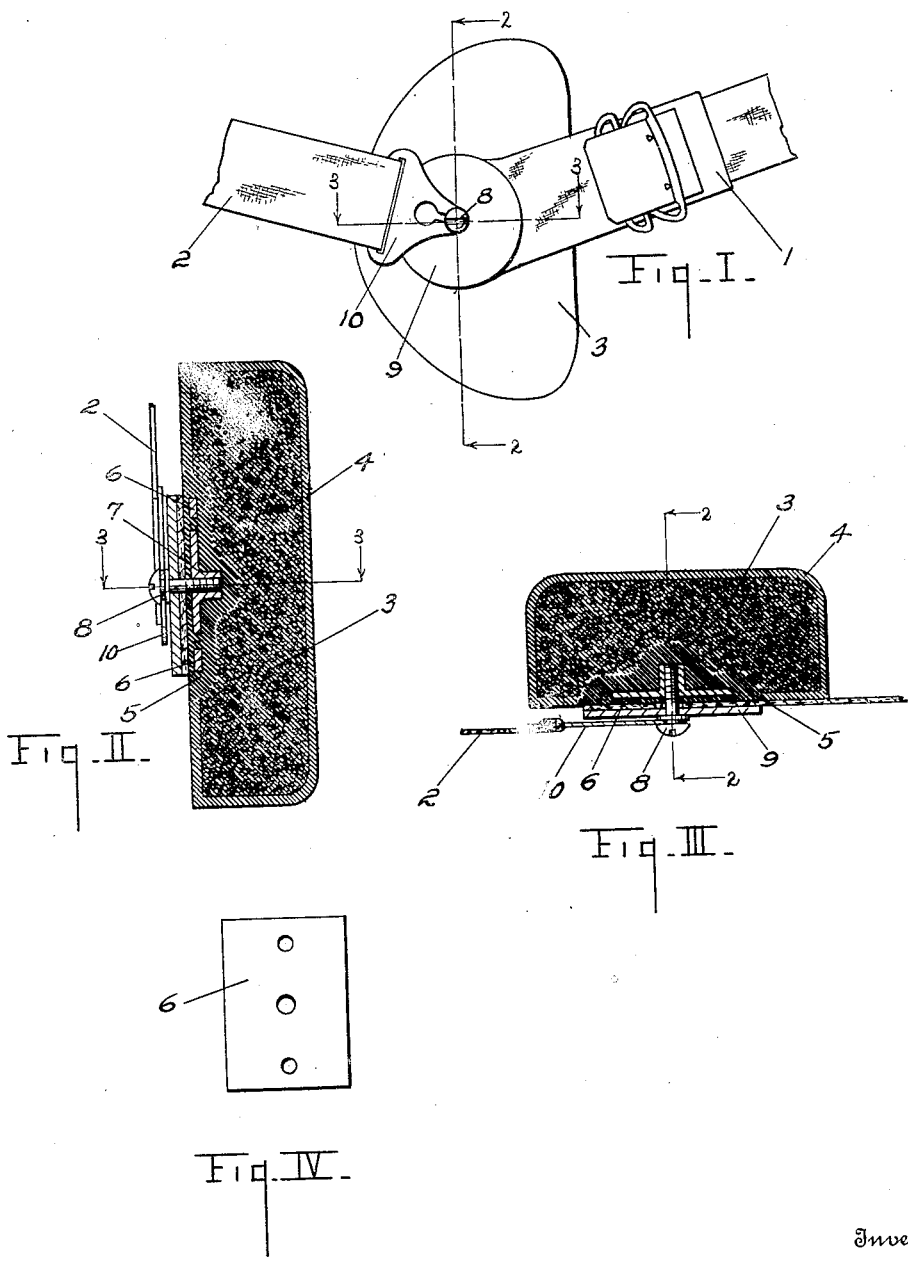

LOUIS REHTHALER, OF BATTLE CREEK, MICHIGAN, ASSIGNOR TO BATTLE CREEK APPLIANCE COMPANY, LTD., OF BATTLE CREEK, MICHIGAN.

TRUSS.

1,381,336.

Specification of Letters Patent. Patented June 14, 1921.

Application filed January 21, 1919. Serial No. 272,297.

*To all whom it may concern:*

Be it known that I, LOUIS REHTHALER, a citizen of the United States residing at Battle Creek, county of Calhoun, State of Michigan, have invented certain new and useful Improvements in Trusses, of which the following is a specification.

This invention relates to improvements in trusses.

The main object of this invention is to provide an improved truss pad of rubber which has the desired resiliency, presents a smooth outer surface, is light in weight, and is sanitary in that it is moisture and air resisting.

A further object is to provide an improved truss pad embodying these advantages which is economical to produce and at the same time very durable.

Further objects, and objects relating to structural details, will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawing, forming a part of this specification, in which:

Figure I is a detail rear view of a truss embodying the features of my invention.

Fig. II is a detail section on a line corresponding to line 2—2 of Figs. I and III.

Fig. III is a detail section on a line corresponding to line 3—3 of Figs. I and II.

Fig. IV is a rear view of the pad attaching plate.

In the drawing similar reference characters refer to similar parts throughout the several views, and the sectional views are taken looking in the direction of the little arrows at the ends of the section lines.

Referring to the drawing, the supporting or attaching means, such as the straps 1 and 2, may be of any desired character to properly support the pad. My improved pad consists of a body portion 3 of sponge or soft cellular rubber, thereby securing resiliency and lightness, and a skin or covering 4 formed integrally with the body, the skin or covering being of relatively soft rubber of close moisture and air excluding texture.

This outer skin provides a smooth flexible surface which may be brought directly into contact with the body and has a pleasant or agreeable feeling and at the same time is perfectly sanitary as it may be readily cleaned and is moisture resisting so that the cellular body portion of the pad is kept clean and sanitary.

At the rear of the body is a central portion 5 of less yielding rubber having a plate 6 embedded therein. This plate has a central forwardly projecting boss 7 threaded to receive the attaching screw 8 for the strap coupling members 9 and 10.

This arrangement furnishes a convenient and practical means for attaching the pad and the same is supported in a manner which does not interfere with its flexibility or cushion qualities.

I have illustrated my improvements in one form in which I have embodied the same. It will be understood that the shape and other adaptations to particular requirements may be varied as desired.

Having thus described my invention, what I claim as new and desire to secure by Letters Patent, is:

A truss pad consisting of a body portion of soft cellular rubber having an integral thin, flexible skin-like continuous covering, and an integral portion of solid rubber at the rear of substantial thickness with an attachment plate embedded therein.

In witness whereof I have hereunto set my hand and seal in the presence of two witnesses.

LOUIS REHTHALER. [L. S.]

Witnesses:
J. V. CONRAD,
W. T. BOBA.